United States Patent [19]

Pletcher et al.

[11] 4,025,694
[45] May 24, 1977

[54] MAGNETIC RECORDING MEDIUM HAVING SEGMENTED COPOLYESTER BINDER

[75] Inventors: Wayne A. Pletcher, Roseville; Russell L. Vermillion, Hastings, both of Minn.

[73] Assignee: Minnesota Mining and Manufacturing Company, St. Paul, Minn.

[22] Filed: June 30, 1975

[21] Appl. No.: 591,936

[52] U.S. Cl. .............................. 428/480; 428/458; 428/483; 428/900; 427/128; 427/131; 260/75 R; 252/62.54

[51] Int. Cl.² ......................................... G11B 5/70

[58] Field of Search ................ 428/900, 480, 483; 427/128, 129, 130, 131; 252/62.54; 260/75 R

[56] References Cited

UNITED STATES PATENTS

| | | | |
|---|---|---|---|
| 3,023,192 | 2/1962 | Shivers | 260/75 R |
| 3,512,930 | 5/1970 | Bottjer | 23/145 |
| 3,651,014 | 3/1972 | Witsiepe | 260/75 R |
| 3,763,109 | 10/1973 | Witsiepe | 260/45.85 R X |
| 3,766,146 | 10/1973 | Witsiepe | 260/75 R |
| 3,775,373 | 11/1973 | Wolfe | 260/75 H X |
| 3,775,374 | 11/1973 | Wolfe | 260/75 R |
| 3,775,375 | 11/1973 | Wolfe | 260/75 R |
| 3,832,314 | 8/1974 | Hoh et al. | 260/26 |
| 3,890,279 | 6/1975 | Wolfe | 260/45.9 R X |
| 3,891,604 | 6/1975 | Wolfe | 260/75 R |
| 3,932,326 | 1/1976 | Hoh et al. | 260/75 R |
| 3,941,904 | 3/1976 | Hoh et al. | 428/480 |

FOREIGN PATENTS OR APPLICATIONS 793,254  8/1968  Canada .............................. 427/128

OTHER PUBLICATIONS

Haines, IBM Tech. Discl. Bull., vol. 4, No. 1, 6–61.

*Primary Examiner*—Ralph S. Kendall
*Attorney, Agent, or Firm*—Cruzan Alexander; Donald M. Sell; Robert E. Granrud

[57] ABSTRACT

Magnetic recording tape, the binder of which is a segmented copolyester of crystallizable ester units

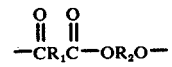

and amorphous ester units

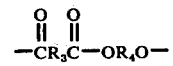

where $R_1$ may be the divalent radical of adipic acid, $R_2$ may be the divalent radical of 1,4-cyclohexanedimethanol, $R_3$ may be $R_1$ or the divalent radical of $C_{36}$ dimer acid, $R_4$ may be $R_2$ or the divalent radical of a polyetherglycol of 200–4000 molecular weight.

7 Claims, No Drawings

MAGNETIC RECORDING MEDIUM HAVING SEGMENTED COPOLYESTER BINDER

CROSS REFERENCE TO RELATED APPLICATION

The thermoplastic segmented copolyester comprising the binder of the magnetic recording medium of this invention is the subject of an application of Wayne A. Pletcher filed of even date herewith Ser. No. 591,935, now abandoned in favor of Ser. No. 699,976, filed June 25, 1975. The disclosure in that application is incorporated herein by reference.

FIELD OF THE INVENTION

This invention concerns a magnetic recording medium, the recording layer of which consists of magnetizable particles in an improved organic binder.

BACKGROUND TO THE INVENTION

Nearly all magnetic recording media have a surface layer consisting essentially of magnetizable particles dispersed in nonmagnetizable binder. To permit recovery and re-use of solvents from which the binder is coated, the solvents should be capable of repeated distillation without chemical change. In this respect, aromatic solvents such as toluene and xylene are superior to the ketones. Ease of solvent recovery is enhanced if only one solvent is present, but it has been difficult to obtain usefully smooth dispersions of magnetic pigment when using only one solvent with some of the binders of the prior art.

A widely used binder material is phenoxy resin which is a high molecular weight thermoplastic copolymer of equivalent amounts of bisphenol A and the diglycidyl ether of bisphenol A such as is sold by Union Carbide Corporation as PKHH. To provide flexibility, the phenoxy resin may be blended with polyurethane. To provide good wear resistance and resistance to blocking at elevated temperatures, the binder polymers are crosslinked, primarily during the drying step, but the crosslinking reactions tend to continue for some time after the tape or other medium has cooled to ambient temperature.

The crosslinking involves a number of problems. First, there is the problem of maintaining adequate potlife. Second, it is desirable that the polishing step, to which most recording tapes are subjected, be carried out after the coating has been dried out before the binder becomes fully crosslinked. The proper timing can be difficult to control. Furthermore, difficulties in slitting are sometimes encountered after phenoxy-urethane binder has fully cured.

Even though crosslinking involves problems, magnetic recording tapes of the prior art employing uncrosslinked binders, such as vinyl resins, have not provided equivalent resistance to wear. Such tapes have also exhibited poor resistance to blocking after exposure to high temperatures, especially if polished to the high degree of smoothness required for many applications.

THE PRESENT INVENTION

The present invention concerns a thermoplastic binder that without crosslinking provides magnetizable coatings which are equivalent to crosslinked phenoxy-urethane coatings in resistance to wear and to blocking at elevated temperatures. Because the binder need not be crosslinked, the above-discussed problems such as uncertain pot-life are avoided. Furthermore, the thermoplastic binder can generally be used with a single solvent such as toluene which withstands repeated distillation without chemical change.

These benefits are accomplished by using as the binder a thermoplastic segmented copolyester normally consisting essentially of about 25 to 75 per cent by weight of amorphous ester units and 75 to 25 percent by weight of crystallizable ester units joined through ester linkages, the crystallizable ester units being of the formula:

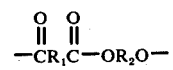

and the amorphous ester units being of the formula:

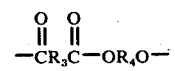

In these formulae $R_1$ is primarily tetramethylene, phenylene and/or naphthalene and may in significant proportion be dimethylene, hexamethylene and/or octamethylene. To enhance solubility of the copolyester where $R_1$ is entirely aromatic, the copolyester preferably contains at least 50 percent by weight of amorphous ester units. Adipic acid is especially useful and may be used by itself or in combination with such dicarboxylic acids as sebacic acid, succinic acid, suberic acid for making the segmented copolyester. To obtain phenylene radicals the dimethyl ester of the aromatic dicarboxylic acid should be employed to permit the condensation reaction to proceed at moderately elevated temperatures.

$R_2$ consists of divalent radicals remaining after removal of the hydroxyl groups of one or more saturated aliphatic diols containing 2 to 12 carbon atoms, preferably 4 to 8. A particularly useful starting material is 1,4-cyclohexanedimethanol. Other representative saturated aliphatic diols include 1,3-butanediol, 1,5-pentanediol, 2-methyl-2,4-pentanediol, 1,6-hexanediol and 1,8-octanediol.

$R_3$ is $R_1$ or $R_5$ where $R_5$ consists of divalent radicals remaining after the removal of the carboxyl groups of saturated aliphatic dimer acids and includes 22 to 50 carbon atoms exclusive of the carboxyl groups originally present in the dimer acid. A readily available source is the hydrogenated form of the $C_{36}$ dimer acid derived from linoleic acid.

$R_4$ is $R_2$ or $R_6$ where $R_6$ consists of divalent radicals remaining after removal of the terminal hydroxyl groups of long chain aliphatic diols having average molecular weights of 200 to 4000. Among useful starting materials are polyetherglycols such as poly(oxyethylene)glycols, poly(oxypropylene)glycols, poly(oxytetramethylene)glycols and random or block copolymers thereof; poly(lactone)glycols, e.g., poly(caprolactone)glycol; poly(oxyalkylenecarbonate)glycols, e.g., poly(oxyethylenecarbonate)glycol; and glycols containing a hydrocarbon main chain, e.g., hydroxy-terminated polybutadiene.

At least one of $R_3$ and $R_4$ in the amorphous ester unit is $R_5$ or $R_6$. If only one of $R_3$ and $R_4$ is $R_5$ or $R_6$, it is easier to predict the properties of the segmented copolyester. Where both $R_3$ and $R_4$ are primarily $R_5$ and $R_6$, respectively, the copolyester should comprise at least about 45 percent by weight of crystallizable ester units to provide magnetizable coatings having good resistance to wear and to blocking at elevated temperatures.

Small amounts of other materials which do not interfere with the polymerization reaction to form the segmented copolyester can be present. In any event, $R_1$, $R_2$, $R_3$, $R_4$ and any other building block should be selected such that the segmented copolyester has a differential thermal analysis (DTA) melting temperature of from about 65° to 150° C and an inherent viscosity of at least 0.5 dl/g at 25° C, as measured in 0.3 g/dl solution of the copolyester in chloroform at 25° C. The DTA glass transition temperature, Tg, should be less than 0° C. The DTA melting temperature is measured in an atmosphere of helium at a temperature rise of 30° C/minute, the test ordinarily being run over the range of about −140° to +200° C.

Those segmented copolyesters which are all or nearly all aliphatic dissolve readily in toluene or xylene and can be used with only one of these or other common organic solvents in the manufacture of magnetic recording tapes. Other solvents for the segmented copolyester which provide solutions of usefully high solids content (e.g., 30–35% by weight) for applying magnetizable coatings include diacetone alcohol, isopropyl alcohol, cyclohexanone and tetrahydrofuran. Where $R_1$ is all or nearly all aromatic, a preferred solvent is cyclohexanone, and it may be desirable to employ a mixture of solvents to obtain the desired coating consistency. While high aromatic content renders the segmented copolyester somewhat more resistant to heat, the advantage of using a single solvent such as toluene may make it desirable that $R_1$ be appreciably aliphatic.

The segmented copolyesters can be prepared by conventional polycondensation polyester-forming reactions wherein one or more short chain diacids and/or long chain diacids or their equivalents (e.g., alcohol esters, acid chlorides, or anhydrides of the diacids) are caused to react with an equivalent amount of one or more short chain diols and/or long chain diols. Since copolyesters of relatively high molecular weight are desired, it is preferable that the reaction be carried out in the presence of a suitable antioxidant and catalyst.

A magnetic recording medium of the present invention generally comprises a nonmagnetic backing member bearing a coating comprising a major proportion by weight of magnetizable particles, such as acicular gamma-$Fe_2O_3$ particles or acicular $CrO_2$ particles, and a minor proportion of the segmented copolyester as the binder. The backing member may be a flexible plastic film as used in tapes or diskettes or a rigid material such as an aluminum sheet used in disk packs or a semi-rigid material such as vinyl card stock used in credit cards. Because the highly loaded segmented copolyester does not adhere well to biaxially-oriented polyethylene terephthalate film, it may be desirable to first apply to the backing member a very thin coating of an adhesion-promoting primer such as the aminized reaction product of an epoxidized polybutadiene as disclosed in U.S. Pat. No. 3,661,874 (Olson). Another useful primer coating has been provided by a vinyl resin containing pendant hydroxyl groups (Union Carbide VROH) through which it is crosslinked by an isocyanate.

Because the segmented copolyester is very strong and tough, it has been used to make a thin, self-sustaining film comprising a major proportion by weight of magnetizable particles. The film was sufficiently tough to withstand creasing without fracture. Such a film may be laminated to credit-card stock as a magnetic recording stripe, the copolyester serving as its own adhesive.

Surprisingly, in view of the fact that no crosslinking is necessary, magnetic recording tapes of the present invention withstand adverse conditions of use as well as do tapes of the prior art having crosslinked phenoxy-urethane binders. For comparative studies, tapes of the present invention have been prepared using as the backing a polyethylene terephthalate film of 40 micrometers thickness which has been biaxially oriented about 3X in each direction and employing conventional acicular gamma-$Fe_2O_3$ particles at 75% loading by weight to provide an $H_c$ in the longitudinal direction of 300–320 oersteds. The following tests are especially meaningful for applications involving high-speed travel of the tape across magnetic heads:

SQUARENESS

The $\phi_r/\phi_{max}$ or the squareness of the hysteresis loop at 3000 oersteds applied field using a 60-cycle M-H meter should normally exceed 0.75.

DISTRIBUTION VALUE ($G_n$)

$G_n$ is determined by differentiating the aforementioned hysteresis loop and is the ratio of $H_c/\Delta H$ where $\Delta H$ is the width of the differentiated hysteresis loop at one-half its peak height. $G_n$ should normally exceed 2.0.

WEAR

A tape 1.27 cm in width is spliced to form a 91.5-cm loop which is driven in contact with a set of four magnetic recording heads under a tension of 482 grams at a speed of 36.6 meters per second. The tape is weighed before and after a 10-minute test. A weight loss of less than 5 mg is considered to show satisfactory resistance to wear. This test is normally run in comparison to a standard instrumentation tape such as No. 888 of Minnesota Mining and Manufacturing Co. or other commercially available instrumentation tapes which are known to experience a weight loss of less than 5 mg.

RESISTANCE TO BLOCKING

A length of the tape 1.27 cm in width and 91.5 cm in length is wound upon itself on a 1.27-cm-diameter stainless steel mandrel under two kilograms tension. After 18 hours in an air-circulating oven at 65° C and 80% relative humidity, the tape is unwound and inspected. If no delamination is found, the tape is considered "Good". If there are only traces of delamination, the tape is considered "Fair".

In general, recording tapes of the invention have excellent resistance to blocking. However if a otherwise desirable tape of the invention has only Fair resistance to blocking, this can be improved by overcoating the magnetizable layer with a very thin coating of highly fluorinated alkyl polyethers such as "Krytox" 143 of E.I. du Pont de Nemours & Co. applied from a 1% solution.

MODULUS

The dynamic modulus of the tape coating is measured of the Rheovibron tester over a temperature range of 0° to 70° C and should be fairly constant over the full temperature range and preferably below $5 \times 10^{10}$ dynes/cm². Above that value, there is a tendency for the magnetizable coating to abrade to an undue extent when subjected to a high speed wear test.

SEGMENTED COPOLYESTER A

Copolyester A is prepared using a 90/10 mol ratio of adipic acid and sebacic acid and a 90/10 mol ratio of 1,4-cyclohexanedimethanol and poly(oxytetramethylene)glycol of 990 molecular weight.

A 3-neck flask is fitted with a mechanical stirrer, a Dean-Starke trap-condenser, a thermometer, and a gas inlet for maintaining an inert atmosphere within the flask. Equivalent amounts of diacids and diols were charged to the flask as follows:

| Parts by weight | |
|---|---|
| 34.5 | Adipic acid |
| 5.3 | Sebacic acid |
| 34.2 | 1,4-cyclohexanedimethanol (approximately 70:30 trans:cis mixture of isomers) |
| 26.0 | Poly(oxytetramethylene)glycol (990 molecular weight) |
| 0.1 | Antioxidant (Ciba Geigy "Irganox" 1010) |

Inert gas is introduced into the flask and the contents of the flask brought to 170° C by means of a heated oil bath. The mixture is stirred and held at this temperature for about 3 hours. During this time, water resulting from the condensation is collected in the trap. The temperature of the mixture is reduced to about 145° C, and the pressure is then reduced to 5 to 0.25 mm Hg. These conditions are maintained for about one hour to remove additional volatile material. About 0.1 part of tetrabutyl titanate catalyst is then added while maintaining an inert atmosphere. The temperature of the mixture is increased to 200° to 220° C and the pressure reduced to 0.15 mm Hg and these conditions maintained for approximately 4 hours.

The resultant segmented copolyester, which comprises by weight 68.2% crystallizable ester units and 31.8% amorphous ester units solidifies to a tough, flexible, colorless, opaque material having an inherent viscosity of 0.8 dl/g, a melt temperature ($T_m$) of about 79° C, a glass transition temperature ($T_g$) of −72° C and an acid number (or value) of 2.0.

SEGMENTED COPOLYESTERS B-D

Copolyesters B-D are prepared in the same way from equivalent amounts of diacids and diols as follows:

Copolyester B. Adipic acid plus 90/10 mol ratio of 1,4-cyclohexanedimethanol and poly(oxytetramethylene)glycol of 990 average molecular weight.

Copolyester C: Adipic acid plus 90/10 mol ratio of 1,4-cyclohexanedimethanol and poly(oxytetramethylene)glycol of 2000 average molecular weight.

Copolyester D: 85/15 mol ratio of adipic acid and sebacic acid plug 90/10 mol ratio of 1,4-cyclohexanedimethanol and poly(oxytetrametylene)-glycol of 990 average molecular weight.

EXAMPLE 1

Polyethylene terephthalate film of 25 microns in thickness which had been biaxially oriented about 3X in each direction and heat set was used as the backing member of a typical magnetic recording tape of the invention. To improve the adhesion of the magnetizable coating, the backing was first primed with a solution of an aminized reaction product of an epoxidized polybutadiene (U.S. Pat. No. 3,661,874). Over the primer coating was applied a 33.7% solids dispersion in cyclohexanone containing the following:

| | Parts by weight |
|---|---|
| Acicular $\gamma$-$Fe_2O_3$ particles | 70.73 |
| Phosphate anionic dispersing agent | 3.54 |
| Aluminum oxide | 1.13 |
| Conductive carbon black | 4.24 |
| Copolyester A | 19.30 |
| Fatty acid derivative lubricant | 1.06 |

The dispersion was prepared as follows: The $\gamma$-$Fe_2O_3$ particles, the dispersing agent and the aluminum oxide were milled together with 64 g of cyclohexanone (54% solids) on a Red Devil shaker in a 0.95-liter Quickie Mill containing 1800 grams of 0.3 cm milling media (steel spheres) for 45 minutes. The carbon black and 55 g of cyclohexanone (total solids 40%) were then added and milling was continued for an additional 15 minutes. Finally, 96.6 g of a 20% solution of the copolyester in cyclohexanone and the lubricant were added and the milling was continued for an additional 15 minutes.

The dispersion was applied over the primer coating using a gravure roll having a knurl of 127 lines per cm. The coating was dried in an air-circulating oven for about 0.5 minute at 82° C followed by one minute at 104° C. Within about one hour, the surface was polished to an average peak-to-peak roughness of about 0.12–0.20 micrometer (using a Bendix Proficorder Model No. 5, 2.5-micrometer stylus). The tape was slit to widths of 1.27 cm for testing.

EXAMPLES 2-4

Example 1 was followed except for the substitution of 19.30 parts by weight of each of the indicated segmented copolyesters as follows:

| Example | Segmented Copolyester |
|---|---|
| 2 | B |
| 3 | C |
| 4 | D |

The magnetic recording tapes of the examples were subjected to the above-described tests together with a commercially available tape of the same general construction as a "Control" except that the binder of the Control was a crosslinked phenoxy-urethane system.

| Example | Squareness | $G_n$ | Wear | Resistance to Blocking | Modulus (dynes/cm$^2$) |
|---|---|---|---|---|---|
| 1 | .78 | 2.5 | 1.8 mg | Good | 4.5 × 10$^{10}$ |
| 2 | .75 | 2.3 | * | Good | 1.7 × 10$^{10}$ |
| 3 | .75 | 2.4 | * | Good | 1.9 × 10$^{10}$ |
| 4 | .79 | 2.1 | 3.0 mg | Fair | 3.2 × 10$^{10}$ |
| Control | .76 | 2.1 | 3.2 mg | Fair | 6.1 × 10$^{10}$ |

*Not tested

We claim:
1. Magnetic recording medium comprising a nonmagnetizable backing member bearing a coating of magnetizable particles in a binder, which binder consists essentially of a thermoplastic segmented copolyester consisting essentially of about 25 to 75 percent by weight of amorphous ester units and 75 to 25 percent by weight of crystallizable ester units joined through ester linkages, the crystallizable ester units beng of the formula

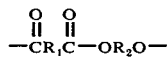

and the amorphous ester units being of the formula

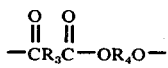

wherein $R_1$ is primarily tetramethylene, phenylene and/or naphthalene, $R_2$ consists of divalent radicals remaining after removal of the hydroxyl groups of one or more saturated aliphatic diols containing 1–12 carbon atoms, $R_3$ is $R_1$ or $R_5$ where $R_5$ consists of divalent radicals remaining after removal of the carboxyl groups of saturated aliphatic dimer acids and contains 22–50 carbon atoms, and $R_4$ is $R_2$ or $R_6$ where $R_6$ consists of divalent radicals remaining after removal of the terminal hydroxyl groups of long chain aliphatic diols having average molecular weights of 200–4000, at least one of $R_3$ and $R_4$ in each amorphous ester unit is $R_5$ or $R_6$, and where $R_1$ is essentially entirely aromatic, the copolyester contains at least 50 per cent by weight of amorphous ester units, and said copolyester has a DTA melting temperature of from about 65° to 150° C, an inherent viscosity of at least 0.5 dl/g at 25° C, as measured in 0.3 g/dl solution in chloroform at 25° C, and a Tg less than 0° C.

2. Magnetic recording medium as defined in claim 1 wherein only one of $R_3$ and $R_4$ is $R_5$ or $R_6$.

3. Magnetic recording medium as defined in claim 1 wherein $R_1$ is primarily the divalent radical of adipic acid.

4. Magnetic recording medium as defined in claim 1 wherein $R_2$ is cycloaliphatic and contains up to 8 carbon atoms.

5. Magnetic recording medium as defined in claim 1 wherein $R_3$ is the divalent radical of $C_{36}$ dimer acid.

6. Magnetic recording medium as defined in claim 1 wherein $R_4$ is poly(oxyethylene)glycol, poly(oxypropylene)-glycol, poly(oxytetrametylene)glycol and/or copolymers thereof.

7. Magnetic recording medium as defined in claim 1 wherein $R_1$ is essentially entirely aromatic.

* * * * *